W. H. SMITH.

Vapor Burner.

No. 3,607.

Reissued Aug. 17, 1869.

This Fig: not included in Reissue.

Witnesses:
R. Boeklen.
W. Omerle

Inventor:
W. H. Smith.

N. PETERS. Photo-Lithographer, Washington, D. C.

UNITED STATES PATENT OFFICE.

JAMES D. SMITH, OF GREIG, NEW YORK, ASSIGNEE OF WILLARD H. SMITH.

IMPROVEMENT IN VAPOR-BURNERS.

Specification forming part of Letters Patent No. 79,404, dated June 30, 1868; reissue No. 3,607, dated August 17, 1869.

*To all whom it may concern:*

Be it known that WILLARD H. SMITH, of the city of New York, county of New York, and State of New York, has made certain new and useful Improvements in Light-Oil-Vapor Burners; and I do hereby declare that the following is a full, clear, and exact description of the same, reference being had to the accompanying drawings, making part of this specification, in which—

Figure 1:
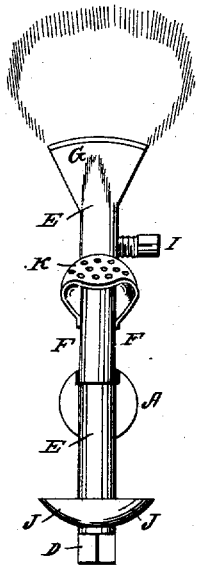
Figure 2:
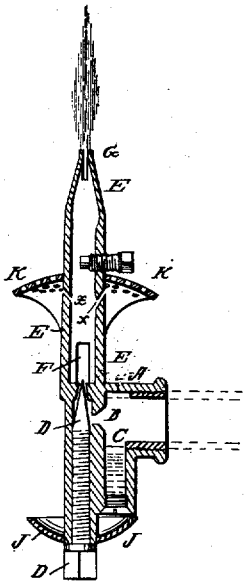
Figure 3:
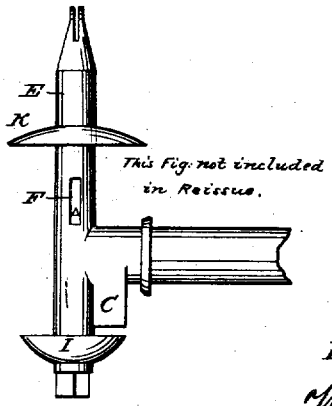

Figure 1 represents a side elevation of the improved burner; Fig. 2, a vertical section of the same.

The nature of this invention consists in the construction of the heaters aforesaid, or gas-jets, having a perforated deflecting flange or flanges arranged in connection over such gas-jets on the air-tube, whereby the heat of said jets is conducted downward to the burner part of the burner and its feed-pipe, causing a more thorough evaporation at the junction of the oil-tube and burner.

To enable others skilled in the art to make and use the invention, I will proceed to describe its construction and operation.

A represents the ordinary tube of the burner, to which the feed-pipe is attached. B is the opening through which the vapors of the oil escape into the burner. Now, below the opening B is arranged a receptacle, C, so that the impurities and solid matters will drop into the receptacle C, and be there detained. From the opening B the vapors pass through the usual valve D into the air-tube E, which is provided with the ordinary air-passages F F, through which the air is furnished, and then mixed with the vapors of the oil, producing the inflammable gas, which passes on to the usual flattened and contracted top end G of the burner and air-tube. I represents the air-regulating screw in the air-tube; and J is the usual cup used for receiving alcohol or light oil for the first heating of the burner, to set it in operation.

Now, in order to produce a better light, more especially in cold weather, and to have a burner capable of giving more heat than those now in use, perforated heaters are employed on the air-tube E, by having fine passages *x x* above the air-passages F F, through which small jets of gas issue; and, by providing perforated flanges K K, the heat from these gas-jets is conducted downward upon the lower part of the burner, and upon the oil as it enters the burner, whereby the evaporation of the oil and supply of air are much encouraged, and a better flame and light produced thereby. The heater K K is perforated, which allows the gas from the jets *x x* to burn both on the outside and inside of the heater K K, therefore creating a greater amount of heat than the ordinary heaters. The sides of these flanges K K are bent downwardly upon the tube A, leaving the sides of these flanges open, as shown in Fig. 1.

By this arrangement, the gas-jets issuing through the passages *x x* are, so to speak, housed, and should they be accidentally extinguished, the draft created by the perforations of the flanges K K will bring the vapor of the jets upward to the flame of the burner, so as to relight the jets through the perforations, thereby preventing the burner from cooling off and letting the fluids run out when left without attendance. As the sides of the flanges K K are brought down to the tube A, a larger heating-surface is also obtained.

I do not claim the passages *x x;* but

What I claim, and desire to secure by Letters Patent, is—

1. Providing the air-tube E, between the air-passages F F and the base of the flame, with perforated heaters, consisting of the heat-conducting flange or flanges K K, substantially as and for the purpose herein stated.

2. Bringing sides of the perforated heater K downwardly upon the tube A, substantially in the manner as and for the purposes set forth.

JAMES D. SMITH.

Witnesses:
M. E. BURDICK,
P. B. DAVIS.